United States Patent [19]
Weinhold

[11] 3,937,501
[45] Feb. 10, 1976

[54] PIPE COUPLING

[76] Inventor: Karl Weinhold, Im Jagdfeld 43, 404 Neuss, Germany

[22] Filed: May 9, 1974

[21] Appl. No.: 468,267

[30] Foreign Application Priority Data
May 26, 1973 Germany.................... 2327050

[52] U.S. Cl. ............. 285/365; 285/369; 285/409
[51] Int. Cl.² .................... F16L 21/02; F16L 21/06
[58] Field of Search .......... 285/369, 373, 233, 112, 285/166, 365, 366, 409, 411

[56] References Cited
UNITED STATES PATENTS

| | | | |
|---|---|---|---|
| 2,725,246 | 11/1955 | Weinhold........................ | 285/373 X |
| 3,495,853 | 2/1970 | Furrer............................ | 285/373 X |
| 3,695,636 | 10/1972 | Graves........................... | 285/233 X |
| 3,733,092 | 5/1973 | Yorke et al..................... | 285/373 X |
| 3,756,629 | 9/1973 | Gibb.............................. | 285/373 X |

FOREIGN PATENTS OR APPLICATIONS

| | | | |
|---|---|---|---|
| 881,504 | 1/1943 | France............................. | 285/166 |

OTHER PUBLICATIONS

German Printed Application, C11600, 9/1956, Hoevels.

*Primary Examiner*—Thomas F. Callaghan
*Attorney, Agent, or Firm*—Sherman & Shalloway

[57] ABSTRACT

A pipe coupling for coupling two pipe ends with annular flanges spaced from the end faces of the pipe ends comprises a plurality of part shells the adjacent ends of two of which are connected by a clamping lever lock and the remaining adjacent ends of which are flexibly connected together, means in the part shells for engaging behind the annular flanges on the pipe ends and a coupling sleeve slidable in the pipe ends between the flanges and having annular seals, sealing the pipe ends to the coupling sleeve.

4 Claims, 2 Drawing Figures

PIPE COUPLING

BACKGROUND OF THE INVENTION

The invention relates to a pipe coupling for two pipe ends, which have an annular flange situated on each pipe end. Such a device may consist of at least two part shells flexibly interconnected, for example, by means of a connecting bolt and of a clamping lever lock, with engagement means, such as flanges, situated on the part shells and extending inwards radially, which engage behind the annular flanges when the device is closed, and with an intermediate member connecting the pipe end, which is sealed off with respect to each pipe end by means of an annular seal.

In a pipe coupling of this kind, the two pipe ends which are to be coupled are of identical structural form, which is advantageous as compared to other types of pipe couplings wherein one pipe end is constructed as a plug-in part and one pipe end as a socket part.

In a pipe coupling of the kind defined in the foregoing, the two pipe ends are constructed as socket parts in each case, that is to say of identical shape, whereas an intermediate member is ambilaterally constructed as a plug-in part, so that the pipe ends may be pushed on to the intermediate member. An annular seal is inset in each case in the internal surface of the pipe ends, whereby the seal required between the socket part and plug-in part is obtained.

To this end, the pipe ends have attachment members, which are initially machined as separate structural components, meaning that the annular flanges, the bearing surfaces for the flanges of the part shells and the internal circumferential grooves for the insertion of the annular seals, are produced by appropriate machining operations. It is only after completion of this production sequence that these pipe ends are interwelded with the actual pipe member. For this purpose, the end face of the pipe member and the end face of the pipe end which is to be attached must be cut very precisely and machined with care, because the welding seam which is to be formed between these end faces should not only have an adequate mechanical load-carrying capacity but should also be completely fluid etc. tight, so that a liquid or gaseous fluid cannot escape from the pipe duct.

The known form of embodiment has numerous disadvantages, whereof one consists in that the interwelding between the pipe ends of the corresponding pipe sections is relatively costly because of the great care required, and in that the welding seam nevertheless remains a source of risk within the pipe interior. It is disadvantageous moreover that difficulties frequently arise in the coating of the pipe ends with a protective layer, for example, during pot galvanizing, since this should in any event be performed prior to complete finishing of the pipe end, to avoid damaging the annular seal. A pot galvanizing operation is frequently also disadvantageous however, in the area of the annular groove receiving the joint, so that further difficulties are engendered by possible covering of the groove. Another disadvantage in this connection consists in that a protective layer of this kind is interrupted in the area of the welding seam, when the pipe end is being welded on.

SUMMARY OF THE INVENTION

It is an object of the invention to enable the construction of a pipe coupling said as that of the kind defined in the foregoing, in such manner that the welding seam required to join the structural component bearing the annular flanges and the actual pipe member is not situated in the actual pipe interior and that, moreover, all surfaces which may possibly be affected by pot galvanizing or the like, are associated with the intermediate member.

According to the invention, there is provided a pipe coupling for coupling two pipe ends having annular flanges spaced from end faces of said pipe ends comprising a plurality of part shells, a clamping lever lock for connecting adjacent ends of first and second part shells engagement means on said part shells for engagement behind said annular flanges of said pipe ends, means for flexibly connecting the remaining adjacent edges of said plurality of part shells, an intermediate member constructed as a coupling sleeve slidable onto said pipe ends between said annular flanges and defining annular recesses therein and annular seals positioned in said annular recesses defined by said coupling sleeve and each adapted to engage one of said pipe ends to seal said one of said pipe ends to said coupling sleeve.

Further according to the invention, there is provided a pipe coupling for coupling two pipe ends comprising annular flanges on each said pipe ends, spaced from end faces of said pipe ends, a plurality of part shells, a clamping lever lock for connecting adjacent ends of first and second part shells engagement means on said part shells for engagement behind said annular flanges of said pipe ends, means for flexibly connecting the remaining adjacent edges of said plurality of part shells, an intermediate member constructed as a coupling sleeve slidable onto said pipe ends between said annular flanges and defining annular recesses therein and annular seals positioned in said annular recesses defined by said coupling sleeve and each adapted to engage one of said pipe ends to seal said one of said pipe ends to said coupling sleeve.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
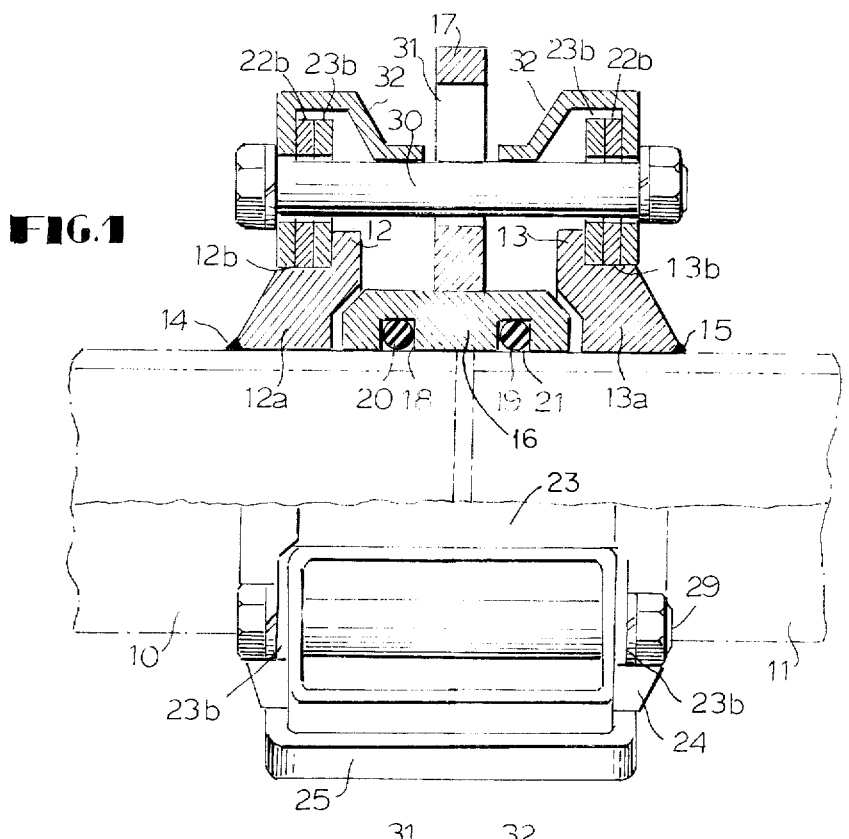
FIG. 1 shows an elevation of the pipe coupling, partially in longitudinal cross-section, and FIG. 2 an axial view of the device comprising partial sleeves, a clamping lever and coupling sleeve, partially as a cross-section corresponding to the line II—II on FIG. 1.

Basically, in a pipe coupling for two pipe ends with an annular flange on each, at least two part shells which are interconnected and provided with means for engaging behind the annular flanges and an intermediate member providing a sealed connection between the two ends, the invention proposes that the annular flanges are set back a short distance with respect to the end faces of the pipe ends, that the inter-mediate member is constructed as a coupling sleeve slidable on the pipe extremities, and that two annular seals are inset into the internal surface of the coupling sleeve, whereof each bears on a respective one of the pipe ends in each case.

In the form of embodiment proposed, the ends of the pipe section in question thus actually form a plug-in part, on to which the coupling member, constructed as a sleeve member is slid, whereas the annular joints internally situated within the sleeve member provide the sealing action required with respect to the pipe ends. No welding seam is situated within the interior of the pipe itself, because the annular flanges, set back from the end faces of the pipe ends, extremities may be fastened to the external surface of the pipe wall by a single welding seam, and this welding seam, may be produced in substantially simple manner, the quality of the welding seam not affecting the sealing of the pipe itself. It is unnecessary moreover for the pipe ends to be cut off in straight and precise manner, since these end faces are situated in the portion between the two annular seals and need not bear against each other; a gap of a few millimeters may even be allowed between these end faces.

Firstly, there is an important economic advantage for these reasons, because the production of a pipe coupling of this kind becomes substantially cheaper. Another advantage consists in that the pipe ends may, for example, be pot galvanized without any difficulty, together with the annular flanges fixed thereon, since all the structural parts which might be expected to be at risk thereby are associated with the intermediate member.

It is also proposed that each annular flange be a component of an annular base element which is inclined in the direction of the end face of the pipe end, starting from its fastening point on the pipe end, and that the annular flanges and the bearing surfaces for the flanges be situated in an outer radial portion of the base elements. It is accomplished thereby that the axial structural length of the part shells may be dimensioned as small as possible, so that the device as a whole acquires a compact and stable form. This applies even more, since it is appropriate to give the base elements themselves a particular minimum axial length, so that a skew-free fixing of these is possible prior to forming the welding seams.

As for the rest, the pipe coupling may be so dimensioned that the coupling sleeve leaves an axial clearance between the annular flanges or rather the base elements, when the device is closed. This renders it possible to take up dimensional variations caused by manufacturing tolerances or possible deformations moreover, which are produced by external action.

In the form described up to now, the intermediate member of the pipe coupling proposed represents a separate component which may be lost, as compared to the partial sleeves and the clamping lever closure which are all connected. It is already known that the intermediate member already described in connection with the prior art, may be connected by a radial fastening, through the connecting bolt, to the part shells and the clamping lever closure. In corresponding manner, this may be accomplished in the case of a pipe coupling in accordance with the invention, in that a radial fastener or holder having a suitable aperture is provided on the coupling sleeve and the connecting bolt connecting the part shells passes through the aperture.

It is known that an intermediate member connected in this way to the part shells may be fixed, with respect to these and in axial direction, in a definite axial position, by means of spacery sleeves slid over the connecting bolt, or the like. In the form of embodiment proposed however, the application of such distance sleeves is inappropriate because, in accordance with another proposal of the invention, the connecting bolt may extend in close proximity past the external peripheral surfaces of the annular flanges in order to obtain a maximum load-bearing capacity against tensile and bending stresses. The axial fastening may be obtained in this case, by means of spacing strips extending in axial direction, engaging over the joint arms of the part shells at both ends of the connecting bolt, and on which the fastener a holder bears in axial direction.

Referring now to the drawings, annular flanges 12 and 13 are fixed to the ends 10 and 11 of the pipes, one to each, at predetermined distance from the end face. The annular flanges 12 and 13 each have a base element 12a and 13a respectively, of which the internal diameter matches the external diameter of the cylindrical pipe wall. The base elements 12a and 13a are secured in each case on the pipe ends 10 and 11 by a welded seam 14 and 15 respectively. Starting from this fastening point, the base elements 12a and 13a extend outwards a short distance in the direction of the end face of the corresponding pipe end 10 or 11 respectively, so that the annular flanges 12 and 13 extend respectively into the radial portion over a coupling sleeve 16.

The coupling sleeve 16 has an internal diameter matching the external diameter of the pipe ends 10 and 11. A radial securing element 17 is externally welded on at approximately the mid axial point of the coupling sleeve 16. The internal surface of the coupling sleeve 16 is provided with two annular grooves 18 and 19, into which is inserted an annular seal 20 and 21 respectively. The axial length of the coupling sleeve 16 is such that an axial clearance is left between the coupling element and the two base elements 12a and 13a. An axial clearance is also present between the end faces of the pipe ends 10 and 11.

A device comprising three part shells 22, 23 and 24 and a clamping lever closure, the latter comprising a clamping lever 25 secured on the partial sleeve 24 by a connecting bolt 26, protects the two pipe extremities 10 and 11 from being pulled apart in axial direction. A tensioning spring 27 hooked into the part shell 22 is secured to the clamping lever 25 by means of a connecting bolt 28.

At both sides, the part shells 22, 23 and 24 have flanges 22a, 23a and 24a extending radially inwards which, when the device is closed, engage behind the annular flanges 12 and 13 and concomitantly bear on cylindrical bearing surfaces 12b and 13b respectively.

The part shells 22, 23 and 24 are interconnected by means of two connecting bolts 29 and 30. The connecting bolt 30 passes through an elongated aperture 31 in the securing element 17. The flanges 22a 23a and 24a of the partial sleeves 22, 23 and 24 extend into joint arms, of which the joint arms 22b 23b respectively are shown in FIG. 1. These arms the connecting bolt 30 passing through the elongated hole 31. Spacing strips 32 are positioned, moreover, at both ends of the connecting bolt 30, which strips 32 engage over the joint arms 22b and 23b in axial direction and are then bent over in such manner that their ends extend approximately along and parallel to the connecting bolt 30. The spacing strips 32 are wider than the elongated hole 31 in the securing element 17, so that the spacing strips 32 can bear with their free end faces on the securing element 17 in the vicinity of the elongated hole 31. The coupling sleeve 16 is thereby held in axial direction with respect to the part shells 22, 23 and 24, so that the coupling sleeve 16 is retained in the axial position in which it must be situated for the closing of the device, even when the device is opened. The connecting bolts 29 and 30 extend directly outside the outer peripheral surfaces of the annular flanges 12 and 13, so that the bending stress exerted on the flanges 22a, 23a and 24a, if a tensile stress is applied to the pipe coupling, is relatively small.

Figure 2:
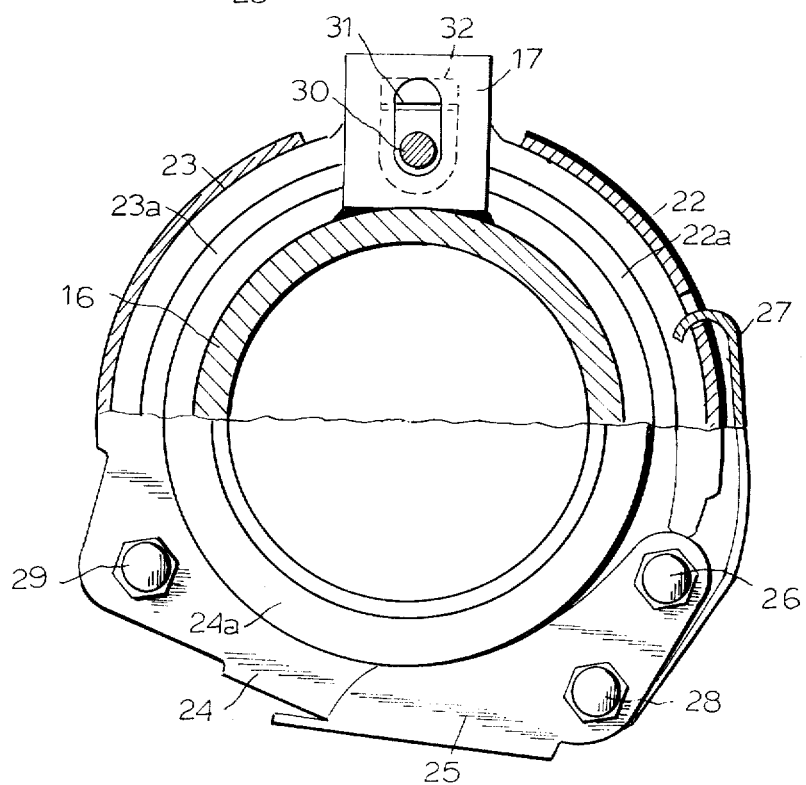

During production, the annular flanges 12 and 13 are thus first pushed on to the pipe ends 10 and 11, and welded on at the approximate position as illustrated. A pot galvanizing operation of the pipe ends 10 and 11, or of the entire pipe sections, can then be carried out without endangering other parts of the pipe coupling. To connect the two pipe ends 10 and 11, these ends are pushed into the coupling sleeve 16 until this insertion is stopped by the coupling sleeve 16 or rather until the annular flanges 12 and 13 are set so close beside each other that the part shells 22, 23 and 24 of the device have their flanges 22a, 23a and 24a laid around the annular flanges 12 and 13. Following this, the tensioning spring 27 is hooked into the part shell 22 and the clamping lever 25 is placed in the position illustrated in FIG. 2, in which the part shells 22, 23 and 24 firmly enflank the annular flanges 12 and 13 and thereby hold the two pipe ends 10 and 11 together in axial direction.

It will be appreciated that a larger number of part shells or only two part shells may be used. The function of the device is fundamentally unaffected thereby, even if a securing system such as the radial securing element 17 is not incorporated.

It will be understood that the above description of the present invention is susceptible to various modification changes and adaptations.

What is claimed is:

1. A quick coupling for coupling two pipe ends comprising an annular flange secured on each of said pipe ends and spaced from the end faces of said pipe ends, a plurality of part shells, a clamping lever lock for connecting adjacent ends of a first and second of said part shells, engagement means on said part shells for engagement behind said annular flanges, means for hingedly connecting the remaining adjacent ends of said plurality of part shells, an intermediate coupling sleeve axially slidable on said pipe ends and between said annular flanges and having a pair of annular recesses therein, annular seals positioned in said annular recesses of said coupling sleeve and each adapted to engage one of said pipe ends to seal said one of said pipe ends to said coupling sleeve, said annular flanges each including an annular base portion spaced from said end face of said pipe end, a flange portion inclined from said base portion outwardly towards said end face of said pipe end, and a radial bearing surface for engagement by said engagement means of said part shells radially outwardly of said coupling sleeve.

2. A pipe coupling as defined in claim 1, wherein said coupling sleeve comprises a sleeve axially spaced from said annular flanges in an assembled state of said coupling.

3. A pipe coupling as defined in claim 1, and further comprising a radial securing element on said coupling sleeve and defining an aperture in said securing element and a connecting bolt forming said flexible connecting means for said part shells passing through said aperture defined by said securing element.

4. A pipe coupling as defined in claim 3, and comprising a bolt forming said connecting bolt extending in close proximity to external surfaces of said annular flanges and spacing strips at each end of said bolt extending over adjacent ends of said part shells associated with said bolt, extending axially of said bolt and bearing against said securing element to hold it in axial position relative to said bolt.

* * * * *